United States Patent Office 3,471,578
Patented Oct. 7, 1969

3,471,578
HALOGENATION OF ORTHO ALPHA-BRANCHED ALKYLPHENOLS IN A NITROPARAFFIN SOLVENT
Joseph D. Odenweller, Bloomfield Hills, Mich., assignor to Ethyl Corporation, New York, N.Y., a corporation of Virginia
No Drawing. Filed July 22, 1964, Ser. No. 384,532
Int. Cl. C07c 37/00, 39/24
U.S. Cl. 260—623                9 Claims

ABSTRACT OF THE DISCLOSURE

Halogenation of ortho-alpha-branched alkylphenols in a nitro paraffin solvent results in a high ratio of para to ortho halogenation.

This invention relates to a process for halogenating phenolic compounds. More specifically, this invention relates to a process of halogenating phenolic compounds predominantly in the para position.

Prior workers have demonstrated that phenolic compounds are readily halogenated by the direct reaction of halogen either with or without a solvent. However, under these conditions a mixture of ortho-, para- and poly-halogenated compounds is formed wherein the para isomers constitutes only about 40 to 60 percent of the product. In many applications, it is the para halogen compound that is desired. In these instances, the phenolic compounds and halogen consumed in making ortho- and poly-halogenated compounds are wasted.

Methods of halogenating phenolic compounds predominantly in the para position are known in the prior art. For example, sulfuryl halide is said to favor para halogenation. Also, the use of Friedel-Craft type catalysts is reported to favor para chlorination. A process combining the use of sulfuryl chloride and Friedel-Craft type catalysts is described in U.S. 2,777,002, Jan. 8, 1957. Although in some instances these prior art methods might be satisfactory, in many cases they cannot be used because they are either too costly or result in degradation of the phenolic compound.

When sulfuryl halide is used as a halogenating agent, a large quantity of sulphur dioxide is produced as a by-product, which presents a formidable disposal problem. Furthermore, in some materials, sulfuryl halide is not particularly effective in directing the halogen to the para position. In addition, sulfuryl halide results in excessively high halogen costs. For these reasons, the use of sulfuryl chloride is not commercially attractive.

When Friedel-Craft type catalysts are included in the halogenating system, some compounds undergo decomposition. For example, alkylated phenols, especially secondary and tertiary alkylated phenols (alpha-branched alkylated phenols), are readily dealkylated or the alkyl group rearranged under the influence of Friedel-Craft type catalysts.

There exists, therefore, a need for a process of halogenating alpha-branched alkylated phenols predominantly in the para position that will not cause a substantial amount of dealkylation or rearrangement. This invention provides such a process.

It is an object of this invention to provide a process of halogenating phenolic compounds predominantly in the para position. It is a further object of this invention to provide a process ideally suited to the halogenation of ortho alkylated phenols in which the alkyl group is branched in the alpha position. A particular object of this invention is to provide a process for the para chlorination of o-tert-butylphenol. Other objects of this invention will become apparent from the following detailed description and appended claims.

The objects of this invention are satisfied by providing a process for halogenating phenols predominantly in the para position, which comprises the reaction of a halogenating agent with a phenolic compound in a nitroparaffin reaction medium.

In a preferred embodiment of this invention, a halogenating agent is reacted with a phenolic compound, wherein a position ortho and para to the hydroxyl radical is unsubstituted and wherein a position ortho to the hydroxyl radical is substituted with an alpha-branched alkyl group containing 3 to 12 carbon atoms, in the presence of a nitroparaffin reaction medium. In a more preferred embodiment of this invention, chlorine is reacted with a phenolic compound having unsubstituted position ortho and para to the hydroxyl radical and a position ortho to the hydroxyl radical substituted with an alpha-branched alkyl group containing 3 to 12 carbon atoms. In a highly preferred embodiment of this invention, the positions meta to the hydroxyl group are unsubstituted. In a most preferred embodiment, chlorine is reacted with o-tert-butylphenol in the presence of 2-nitropropane.

Preferably, the phenolic reactants employed in this invention have a hydroxyl radical bonded to an isolated benzene nucleus. An isolated benzene nucleus is a phenyl radical which is not within a fused ring system and, moreover, does not contain any carbon to carbon unsaturation at a position alpha to the aromatic ring.

The preferred phenolic reactants are phenols wherein a position ortho and a position para to the hydroxyl group is unsubstituted and wherein a position ortho to the hydroxyl radical is substituted with an alpha-branched alkyl group containing 3 to 12 carbon atoms. These phenolic compounds are sometimes referred to as alpha-branched ortho alkylated phenols. Alpha-branched alkyl groups are also known in the art as secondary or tertiary alkyl groups. These compounds can be represented by the following formula:

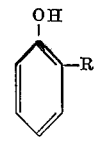

(I)

wherein R is an alpha-branched alkyl group having 3 to 12 carbon atoms.

Although the preferred phenolic reactants employed in the process of this invention have the structural formula given above, this invention is also applicable to phenolic compounds in which the ortho position is substituted with an alpha-branched aralkyl radical or an alpha-branched cycloalkyl radical. In other words, the process of this invention can be carried out by halogenating a phenolic compound having the following formula:

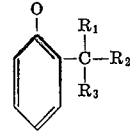

(II)

wherein $R_1$, $R_2$ and $R_3$ are hydrogen, alkyl, aralkyl, aryl or cycloalkyl radicals, such that the total number of carbon atoms in $R_1$, $R_2$ and $R_3$ does not exceed 11, and wherein only one $R_1$, $R_2$ and $R_3$ can be hydrogen. Furthermore, two of the R groups in Formula II can be joined together through a hydrocarbon chain to form a cycloalkyl radical. In some instances, phenolic compounds of Formula II, wherein $R_1$, $R_2$ or $R_3$ are unsaturated radicals, may also be chlorinated in the alpha-branched substituent group. Consequently, it is preferred that $R_1$, $R_2$ and $R_3$ be saturated.

Moreover, the process of this invention is not limited to phenols containing only hydrocarbon substituents other than the hydroxy radical. Thus, phenolic compounds containing other functional groups substituted in the benzene ring or alpha-branched alkyl group, such as halogens, amino groups, nitro groups, carboxyl groups, carbonyl radicals, and the like, can be employed. Preferably, these groups neither hinder the course of the reaction of this process nor are they reactive under the process conditions employed.

Examples of phenolic reactants which can be employed in the process of this invention include, among others, o-isopropyl phenol, o-tert-butylphenol, o-sec-butylphenol, o-sec-amyl phenols, o-tert-amyl phenol, o-sec-hexyl phenols, o-tert-hexyl phenols, o-sec-octyl phenols, o-tert-octyl phenols, o-sec-nonyl phenols, o-tert-nonyl phenols, o-sec-decyl phenols, o-tert-decyl phenols, o-sec-dodecyl phenols, o-tert-dodecyl phenols, o-cyclopentyl phenol, o-cyclohexyl phenol, o-($\alpha$-methylbenzyl) phenol, o-($\alpha,\alpha$-dimethylbenzyl) phenol, o-($\alpha$-methyl-$\alpha$-chlorobenzyl) phenol, o-($\alpha$-methyl $\beta$-chloroethyl) phenol, o-($\alpha$-methyl-$\alpha$-nitroethyl) phenol, o-($\alpha$-methyl-$\alpha$-nitrobenzyl) phenol, $\alpha$-methyl - $\alpha$ - dimethylamino - o - cresol, $\alpha$ - phenyl - $\alpha$-dimethylamino-o-cresol, and the like.

The nitro reaction media suitable for use in this process are reaction media that are inert under the reaction conditions employed and which contain a nitro group bonded to carbon. The preferred reaction media used in this invention are nitroparaffins. Nitroparaffins employed in this process include nitro hydrocarbons having the empirical formula $C_nH_{2n+2-x}(NO_2)_x$. Examples of these nitroparaffins include 1-nitrobutane, 2-nitrobutane, 1-nitropentane-1-nitro-2-methylbutane, 2-nitropentane, and the like.

Although, in general, we prefer nitroparaffins having the empirical formula shown above, other nitro hydrocarbons having the empirical formula $C_nH_{2n-x}(NO_2)_x$ that can be used. This formula represents a class of cycloparaffinic nitro compounds and includes such compounds as nitrocyclopentane and nitrocyclohexane.

Furthermore, nitroparaffins containing substituents in addition to nitro groups can be employed. These include the group known as halonitro compounds. Examples of halonitro compounds are chloronitromethane, dichloronitromethane, chloropicrin, 1 - chloro - 2 - nitroethane, 1-chloro - 1 - nitroethane, 1,1 - dichloro - 1 - nitroethane, 1-chloro - 2 - nitropropane, 2 - chloro - 2 - nitropropane, 1,1 - dichloro - 1 - nitropropane, 2 - bromo - 2 - nitropropane, 1,1-dibromo-1-nitropropane.

The more preferred nitroparaffins used in this process are nitroparaffins containing 1 to 6 carbon atoms. The still more preferred nitroparaffins of this invention are nitroparaffins containing 1 to 3 carbon atoms. Examples of these include nitromethane, dinitromethane, nitroethane, 1,1 - dinitroethane, 1 - nitropropane, 2 - nitropropane, 1,2 - dinitropropane and 2,2 - dinitropropane. The most preferred solvent employed in this process is 2-nitropropane.

Mixtures of different nitroparaffins can also be employed in this process. Furthermore, other inert solvents may be employed in addition to the nitro reaction medium. Examples of such inert diluents are n-pentane, isopentanes, hexanes, octanes, methylene dichloride, chloroform, carbontetrachloride, acetonitrile, and the like.

Halogenating agents suitable for use in the process of this invention are those materials containing available halogen. Examples of such halogenating agents include the class of halogenating agents in which the halogen is bound to a different atom but is available for substitution into a phenolic compound. Examples of this class include phosphorus pentachloride, phosphorus pentabromide, iodine monochloride, sulfuryl chloride, sulfuryl bromide, thionyl chloride, thionyl bromide, sulfur dichloride, antimony pentachloride, and the like. The preferred halogenating agents of this process are the free halogens and the most preferred are elemental bromine and chlorine.

The process of this invention comprises contacting a halogenating agent with a phenolic compound in the presence of a nitro reaction medium. Exemplary of the benefits derived from this process is the chlorination of o-tert-butylphenol. When this chlorination is carried out in the absence of a solvent, the ratio of para to ortho chlorination is 1.4, but when this same chlorination is conducted in the presence of 2-nitropropane, a nitro reaction medium, the ratio of para to ortho chlorination is about 4.5. Similar benefits are obtained in the halogenation of other alpha-branched ortho substituted phenols.

Although the temperature at which the process is carried out is not critical, it is preferred to conduct the process at a temperature high enough to bring about a rapid substitution of halogen into the phenolic compound, but not high enough to cause undesired degradation of the reactants, reaction product or solvent. A preferred temperature range for carrying out this process is from about 0° C. to about 100° C. A more preferred temperature range is from about 20 to about 80° C., and a most preferred temperature range is from about 40 to about 60° C. In this temperature range a rapid reaction occurs yielding the desired product with substantially no degradation of the nitro reaction medium. Furthermore, conducting the reaction in this temperature range allows efficient removal of the heat of reaction due to the substantial temperature differential between the reactants and coolant.

The reaction should be carried out with sufficient agitation to disperse the halogenating agent uniformly throughout the reaction mass. Thorough agitation also promotes efficient heat removal. Although it is preferred that the process be carried out at atmospheric pressure, the process is operable at pressures below and above atmospheric. A preferred pressure range is from 1 to about 10 atmospheres and the most preferred pressure range is from 1 to about 2 atmospheres.

Although the process may be carried out in an inert atmosphere, such as nitrogen, it is normally not necessary to make such provisions. The process may be carried out in the presence of air unless the phenolic compound is extremely susceptible to oxidation, in which case it may be preferred to conduct the halogenation under an inert atmosphere. The time required to carry out the reaction is not an independent variable as it depends on other factors such as temperature, degree of agitation and reactivity of the halogenating agent and phenolic compound. Generally, the reaction between a halogenating agent and a phenolic compound is extremely rapid and the actual time required to carry out the reaction will be determined by the rate of heat removal rather than the reaction rate. To assure complete reaction, it is preferred that agitation of the reactants be continued for 5 minutes to an hour after all reactants have been combined. In most cases, it is more preferred that this final reaction time be in the range of 15 to 30 minutes.

Utilization of the halogenating agent in the process is, in most instances, essentially complete. A large excess of halogenating agent should not be used because it may lead to increased di- and poly-halogenation at the expense of the desired para halogenated compound. A preferred range of halogen reactant is from 0.8 to 1.25 theories of the quantity of halogenating reagent required for monohalogenation. When halogenating a phenolic compound containing one unsubstituted position ortho to the hydroxyl radical and another unsubstituted position para to the hydroxyl radical, such as an alpha-branched ortho alkylated phenol, optimum yields of the para halophenol and minimum amounts of ortho and dihalophenols are obtained when from 0.85 to 1.06 theories of halogen are employed. When less halogen is used substantial amounts of non-halogenated phenolic compound remains in the reaction mixture, and when greater amounts of halogen are employed a sharp increase in the amount of di-halogenated phenolic compound occurs with a concurrent decrease in the amount of the desired para halogenated phenolic compound. This feature of the process is demonstrated by the following example, in which 900 parts by weight of ortho-tert-butylphenol were dissolved in 2460 parts of 2-nitropropane. Over a two hour period, 480 parts of chlorine was fed into the liquid phase while maintaining the temperature at 20° C. This is 1.16 theories of chlorine. Samples were withdrawn and analyzed during the chlorine addition, using vapor phase chromatography with a Carbowax 20,000 column. The results obtained are shown in the following Table I.

TABLE I

| Theories of Cl₂ added | Wt. percent o-tert-butyl-phenol | Wt. percent 2-tert-butyl-4-chloro-phenol | Wt. percent 2-tert-butyl-6-chloro-phenol | Wt. percent 2-tert-butyl 4,6-dichloro phenol |
|---|---|---|---|---|
| 0.29 | 62.8 | 30.7 | 6.7 | 0.9 |
| 0.56 | 42.6 | 46.0 | 9.7 | 1.6 |
| 0.85 | 14.6 | 66.8 | 16.2 | 1.7 |
| 0.95 | 7.0 | 71.2 | 17.2 | 4.6 |
| 1.00 | 3.5 | 73.9 | 16.9 | 5.7 |
| 1.06 | 0.6 | 74.2 | 16.5 | 8.6 |
| 1.13 | 0.0 | 67.2 | 17.1 | 15.7 |

The data in Table I shows the sharp increase in 2-tert-butyl-4-6-dichlorophenol and a concurrent decrease in 2-tert-butyl-4-chlorophenol encountered when over 1.06 theories of chlorine are employed. This relationship is brought out most clearly by the following Table II which shows the ratio of the weight percent para chloro compound to the weight percent ortho chloro compound in the final product as a function of the theories of chlorine added.

TABLE II

| Theories of Cl₂ added | Para-ortho ratio | Wt. percent 2-tert-butyl-4,6-dichloro-phenol | Wt. percent o-tert-butylphenol |
|---|---|---|---|
| 0.29 | 4.60 | 0.9 | 62.8 |
| 0.56 | 4.74 | 1.6 | 42.6 |
| 0.85 | 4.12 | 1.7 | 14.6 |
| 0.95 | 4.13 | 4.6 | 7.0 |
| 1.00 | 4.36 | 5.7 | 3.5 |
| 1.06 | 4.50 | 8.6 | 0.6 |
| 1.13 | 3.93 | 15.7 | 0.0 |

These results clearly point out that when less than 0.85 theories of halogenating agent are used a substantial amount of the starting phenolic compound remains in the reaction mixture, and when over 1.06 theories of halogenating agent are used a sharp increase in the amount of dihalogenated phenolic compound occurs with a concurrent decrease in the para to ortho ratio.

It is preferred that the quantity of nitro reaction medium employed in the practice of this invention be such that the mole ratio of nitro reaction medium to phenolic compound exceeds about 2.3. When less reaction medium is used the ratio of para to ortho chlorination decreases rapidly. The following experiment was carried out in which the mole ratio of nitro reaction medium to phenolic compound was varied from 1.15 to 4.6. In this experiment, the nitro reaction medium employed was 2-nitropropane and the alpha-substituted ortho alkylated phenol was o-tert-butylphenol. The results obtained are shown in the following Table III.

TABLE III

| Reaction medium/phenolic compound (mole ratio): | Para/ortho chlorination (mole ratio) |
|---|---|
| 4.6 | 4.0 |
| 2.3 | 4.0 |
| 1.15 | 3.1 |

These results demonstrate that when the mole ratio of reaction medium to phenolic compound is decreased below 2.3 the ratio of para to ortho chlorination decreases rapidly. Since no benefit is obtained in using nitro reaction medium in excess of the preferred quantity, it is the normal practice to limit the quantity of nitro reaction medium at less than about 10 moles of nitro reaction medium per mole of phenol. If, for any reason, more solvent is required as a means of causing all reactants to dissolve or as an aid in heat removal, an inert diluent can be added in addition to the required nitro reaction medium. Examples of such inert diluents have been given previously.

The halogenated phenolic compounds produced by this process can be recovered by any of the suitable methods of product isolation known in the chemical industry. A most facile method is to first water wash the final reaction mass to remove HCl and/or other water soluble impurities. Following this, the reaction mass is distilled, thereby separating the solvent and the various halophenol isomers.

If a highly pure form of the halogenated phenolic compound is not required, it is not necessary to separate the halophenol isomers inasmuch as the predominant isomer will be the para halophenol and, in such cases, a satisfactory product may be obtained by merely distilling the solvent from the remaining halophenols. In still other cases, where the halophenols are used as chemical intermediates, it is often expedient to leave the halophenols in the solvent which is then used as a solvent for a subsequent reaction.

The following non-limiting examples illustrate the practice of this invention in detail. All parts are parts by weight unless otherwise stated.

EXAMPLE I

The following experiment was carried out in order to demonstrate the product distribution obtained upon chlorinating o-tert-butylphenol, an alpha-branched ortho alkylated phenol, in the absence of a nitro reaction medium.

In a reaction vessel, equipped with an agitator, thermometer and means for cooling, was placed 75 parts o-tert-butylphenol. Forty parts of chlorine (1.12 theories) was then passed into the liquid, phase, over a 75 minute period, while maintaining the temperature at 20° C. Vapor phase chromatographic analysis of the product showed it to consist of the following:

2-tert-butyl-4-chlorophenol—45 weight percent
2-tert-butyl-6-chlorophenol—32 weight percent
2-tert-butyl-4,6-dichlorophenol—12 weight percent
o-tert-Butylphenol—7 weight percent

EXAMPLE II

To a reaction vessel similar to that used in Example I was charged 900 parts of o-tert-Butylphenol and 2,460 parts of 2-nitropropane, giving a mole ratio of 2-nitropropane to o-tert-Butylphenol of 4.6. Over a two hour period, 362 parts of chlorine (0.85 theories) was passed into the liquid phase while maintaining the temperature at about 20° C. The reaction mass was then washed twice with 1,200 parts of water and the 2-nitropropane distilled out at an absolute pressure of 15 mm. of Hg to a liquid temperature of 135° C. Vapor phase chromatographic analysis of the product showed it to consist of the following:

2 - tert - butyl - 4 - chlorophenol—66.8 weight percent
2 - tert - butyl - 6 - chlorophenol—16.2 weight percent
2 - tert - butyl - 4,6 - dichlorophenol—1.7 weight percent
o - tert - Butylphenol—14.6 weight percent

EXAMPLE III

An experiment was carried out in a manner identical with Example II except that 452 parts of chlorine (1.06 theories) were employed. Vapor phase chromatographic analysis of the product showed it to consist of the following:

2-tert-butyl-4-chlorophenol—74.2 weight percent
2-tert-butyl-6-chlorophenol—16.5 weight percent 2-tert-butyl-4,6-dichlorophenol—16.5 weight percent
o-tert-Butylphenol—0.6 weight percent As demonstrated by the examples, striking results in the chlorination of alpha-branched ortho alkylated phenols, a difficult class of compounds to chlorinate in a position ortho to the hydroxyl group, are obtained by this process. Other types of compounds, such as alkylated benzenes and alkylphenyl ethers have been chlorinated in 2-nitropropane (L. M. Stock et al., Tetrahedron Letters, 13, 9–13 (1960), but these types of compounds are completely different from alpha-branched ortho alkylated phenols, which are easily decomposed and which contain directive influences to positions ortho, meta and para to the hydroxyl radical.

EXAMPLE IV

The following experiment was carried out using a mole ratio of nitro reaction medium to phenolic compound below the minimum preferred ratio of 2.3. In this experiment, the mole ratio of nitro reaction medium to phenolic compound was 1.16.

To a reaction vessel similar to that used in Example I was added 75 parts of o-tert-Butylphenol and 51.5 parts of 2-nitropropane. Over a 1.5 hour period, 36 parts of chlorine (1.0 theories) were passed into the liquid phase while maintaining the temperature at about 20° C. Vapor phase chromatographic analysis of the final product, excluding 2-nitropropane, showed it to be as follows:

2-tert-butyl-4-chlorophenol—54 weight percent
2-tert-butyl-6-chlorophenol—17 weight percent
2-tert-butyl-4,6-dichlorophenol—9 weight percent
o-tert-Butylphenol—11 weight percent These results show that when less than the preferred quantity of nitro reaction medium is used the ratio of para to ortho chlorination decreases and the quantity of dichlorinated material increases despite the fact that a substantial quantity of unchlorinated phenolic compound is still present.

EXAMPLE V

To a reaction vessel similar to that used in Example I was added 27.4 parts of o-tert-Butylphenol and 52 parts of 2-nitropropane. In a separate vessel, 13 parts of chlorine (1.0 theories) were dissolved in 103 parts of 2-nitropropane. The chlorine solution was then added to the o-tert-Butylphenol solution, over a seven minute period, while maintaining the temperature at about 20° C. Vapor phase chromatographic analysis of the reaction product, excluding 2-nitropropane, showed it to consist of 77.6 percent 2-tert-butyl-4-chlorophenol and 22.4 percent 2-tert-butyl-6-chlorophenol.

EXAMPLE VI

To a reaction vessel similar to that used in Example I was added 205 parts of 2-nitropropane and 75 parts of o-tert-butylphenol, giving a mole ratio of 2-nitropropane to o-tert-butylphenol of 4.1. Over a twenty-five minute period, 74.2 parts of sulfuryl chloride (1.1 theories) were added to the reaction vessel while maintaining the temperature at 20° C. Vapor phase chromatographic analysis of the reaction product, using a silicon oil column and excluding 2-nitropropane, showed it to consist of 82 percent 2-tert-butyl-4-chlorophenol and 18 percent 2-tert-butyl-6-chlorophenol. The actual 2-tert-butyl-4-chlorophenol was slightly lower than indicated because it was later discovered that a silicon oil column does not efficiently separate 2-tert-butyl-4-chlorophenol from 2-tert-butyl-4,6-dichlorophenol and, therefore, a small percentage of product reported as 2-tert-butyl-4-chlorophenol was actually 2-tert-butyl-4,6-dichlorophenol. (In Examples I through V vapor phase chromatographic analyses were carried out using a "Carbowax 20,000 on Chromosorb P" column, which efficiently separates all reaction products.)

EXAMPLE VII

To a reaction vessel similar to that used in Example I is added 136 parts of o-isopropylphenol and 205 parts of 2-nitropropane, giving a mole ratio of 2-nitropropane to o-isopropylphenol of 2.3. Over a thirty minute period, 75.2 parts of chlorine (1.06 theories) are passed into the liquid phase while maintaining the temperature at 40–50° C. The reaction mass is then washed twice with 200 parts of water and the 2-nitropropane solvent then distilled out in the manner employed in Example II. The product consists predominantly of 2-isopropyl-4-chlorophenol.

Similar results are obtained when the reaction medium consists of an equal mole quantity of nitroethane.

EXAMPLE VIII

To a reaction vessel similar to that used in Example I is added 150 parts of o-sec-butylphenol and 205 parts of 2-nitropropane, giving a mole ratio of 2-nitropropane to o-sec-butylphenol of 2.5. Over a one hour period, 603 parts of chlorine (0.85 theories) are passed into the liquid phase while maintaining the temperature at 50–60° C. After removal of the solvent the product consists predominantly of 2-sec-butyl-4-chlorophenol.

Similar results are obtained when the reaction medium consists of an equal mole quantity of a mixture of nitromethane and nitroethane.

EXAMPLE IX

In a reaction vessel similar to that used in Example I is placed 165 parts of o-sec-amylphenol and 140 parts of nitromethane, giving a mole ratio of nitromethane to o-sec-amylphenol of 2.3. Over a one hour period, 160 parts of bromine (1.0 theories) are added to the reaction mass while maintaining the temperature at about 50° C. Following removal of the nitromethane solvent the product consists predominantly of 2-sec-amyl-4-bromophenol.

EXAMPLE X

In a reaction vessel similar to that used in Example I is placed 207 parts of o-sec-octylphenol and 275 parts of 2-nitro-2-chloropropane, giving a mole ratio of 2-nitro-2-chloropropane to o-sec-octylphenol of 2.3. Over a thirty minute period, 71 parts of chlorine (1.0 theories) are passed into the liquid phase while maintaining the temperature at 50–60° C. Following removal of the solvent the product consists predominantly of 2-sec-octyl-4-chlorophenol.

Similar results are obtained in the above example when an equal mole quantity of o-sec-dodecylphenol is used in place of o-sec-octylphenol.

EXAMPLE XI

In a reaction vessel similar to that used in Example I is placed 198 parts of o-($\alpha$-methylbenzyl) phenol and 274 parts of nitrocyclohexane, giving a mole ratio of nitrocyclohexane to o-($\alpha$-methylbenzyl) phenol of 2.3. Over a one hour period, 71 parts of chlorine (1.0 theories) are added to the liquid phase while maintaining the temperature at 40–50° C.

Similar results are obtained when o-($\alpha,\alpha$-dimethylbenzyl) phenol is used in place of o-($\alpha$-methylbenzyl) phenol.

EXAMPLE XII

In a reaction vessel similar to that used in Example I is placed 263 parts of $\alpha$-methyl-$\alpha$-dimethylamino-cresol, 280 parts of 1,1-dichloro-1-nitropropane and 100 parts of isooctane. This results in a mole ratio of 1,1-dichloro-1-nitropropane to $\alpha$-methyl-$\alpha$-dimethylamino-o-cresol of 2.3. Over a one hour period, 71 parts of chlorine (1.0 theories) are added to the liquid phase while maintaining the temperature at 40–60° C. Following removal of the solvent, the product consists predominantly of para chloro-$\alpha$-methyl-$\alpha$-dimethylamino-o-cresol.

EXAMPLE XIII

In a reaction vessel similar to that used in Example I is placed 176 parts of o-cyclohexylphenol and 386 parts of 2-bromo-2-nitropropane, giving a mole ratio of nitro reaction medium to o-cyclohexylphenol of 2.3. Over a one hour period, 160 parts of bromine (1.0 theories) are added to the reaction mass while maintaining the temperature at 40–60° C. Following removal of the solvent, the product consists predominantly of 2-cyclohexyl-4-bromophenol.

Similar results are obtained when an equal mole quantity of 2-nitropentane is used as the nitro reaction medium.

Many of the para halophenols produced by the process of this invention are known compounds. They have the many utilities known for these compounds. The products of this invention may be employed as intermediates in the synthesis of other organic compounds through reactions involving either the halogen atom or the hydroxyl group. Para halophenols, and especially o-alkylated para halophenols, are known to possess bacteriostatic properties. Para halophenols, and especially o-alkylated para chlorophenols, are useful intermediates in the preparation of antioxidants. For example, (as described in U.S. 3,146,273, issued Aug. 25, 1964) two molecules of 2-tert-butyl-4-chlorophenol may be coupled at their open ortho position through a methylene bridge by reaction with formaldehyde to yield 2,2'-methylene bis (6-tert-butyl-4-chlorophenol), an excellent antioxidant in hydrocarbon fuels and lubricating oils.

Having fully described the process of my invention in detail, it is desired that it should be limited only within the spirit and scope of the following claims.

I claim:
1. A process for halogenating a phenolic compound wherein a position ortho and para to the hydroxyl radical is unsubstituted and wherein a position ortho to the hydroxy radical is substituted with an alpha-branched alkyl group containing 3 to 12 carbon atoms, said process comprising reacting a halogen with said phenolic compound in the presence of a nitroparaffin reaction medium wherein the mole ratio of nitroparaffin to said phenolic compound is greater than 1.15 and wherein from 0.8 to 1.25 moles of halogen are employed for each mole of said phenolic compound.

2. The process of claim 1 wherein said phenolic compound is o-isopropyl phenol.
3. The process of claim 1 wherein said phenolic compound is o-tert-butylphenol.
4. The process of claim 1 wherein said nitroparaffin reaction medium contains from 1 to 3 carbon atoms.
5. The process of claim 4 wherein said nitroparaffin reaction medium is 2-nitropropane.
6. The process of claim 5 wherein the mole ratio of 2-nitropropane to said phenolic compound is greater than 2.3.
7. The process of claim 6 wherein from 0.85 to 1.06 moles of halogen is employed for each mole of said phenolic compound.
8. The process of claim 7 wherein said halogen is chlorine.
9. A process for chlorinating o-tert-butylphenol predominantly in the position para to the hydroxyl radical, said process comprising contacting chlorine with o-tert-butylphenol in the ratio of 0.85 to 1.06 moles of chlorine per each mole of o-tert-butylphenol, said process being carried out in the presence of 2-nitropropane such that the mole ratio of 2-nitropropane to o-tert-butylphenol is greater than 2.3.

References Cited
UNITED STATES PATENTS

| | | | |
|---|---|---|---|
| 2,176,010 | 10/1939 | Mills | 260—623 |
| 2,777,002 | 1/1957 | Sullivan et al. | 260—623 |
| 3,038,882 | 1/1962 | Galvin et al. | 260—39 |

OTHER REFERENCES

Fileti, "Gazzetta Chimica Italiana," vol. XVI, 1886 QD 1628.

Jones, "Chem. Soc. of London" (1941), pp. 358–364, Adams et al., "J. Amer. Chem. Soc." vol. 61 (1939), pp. 1134–1137.

Woolett et al., "J. Amer. Chem. Soc.," vol. 52 [1930], pp. 4018–21.

BERNARD HELFIN, Primary Examiner

W. B. LONE, Assistant Examiner

U.S. Cl. X.R.

260—619

PO-1050
(5/69)

UNITED STATES PATENT OFFICE
CERTIFICATE OF CORRECTION

Patent No. 3,471,578      Dated October 7, 1969

Inventor(s) Joseph D. Odenweller

It is certified that error appears in the above-identified patent and that said Letters Patent are hereby corrected as shown below:

Column 2, Formula II, that portion of the formula reading $$\overset{O}{\underset{|}{\phantom{X}}} \quad \text{should read} \quad \overset{OH}{\underset{|}{\phantom{X}}}$$

SIGNED AND
SEALED

JAN 6 - 1970

(SEAL)
Attest:

Edward M. Fletcher, Jr.
Attesting Officer

WILLIAM E. SCHUYLER, JR.
Commissioner of Patents